(12) United States Patent
Czamara et al.

(10) Patent No.: US 9,891,682 B1
(45) Date of Patent: Feb. 13, 2018

(54) POWER MANAGEMENT FOR DEVICES

(71) Applicant: Amazon Technologies, Inc., Seattle, WA (US)

(72) Inventors: Michael Phillip Czamara, Seattle, WA (US); Brock Robert Gardner, Seattle, WA (US); Osvaldo P. Morales, Seattle, WA (US); Robin McCulloch, Mornington (IE); James R. Hamilton, Seattle, WA (US); Jerry James Hunter, Medina, WA (US); Nigel Martin McGee, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/866,360

(22) Filed: Sep. 25, 2015

(51) Int. Cl.
*G06F 1/26* (2006.01)
*G06F 1/32* (2006.01)
*G06F 13/40* (2006.01)

(52) U.S. Cl.
CPC .......... *G06F 1/266* (2013.01); *G06F 13/4068* (2013.01)

(58) Field of Classification Search
CPC ...................................... G06F 1/266
USPC ........................ 713/300, 320, 340
See application file for complete search history.

(56) References Cited

U.S. PATENT DOCUMENTS

| | | | |
|---|---|---|---|
| 6,415,388 B1 * | 7/2002 | Browning ............... | G06F 1/206 702/132 |
| 6,986,067 B2 * | 1/2006 | Odaohhara ............... | G06F 1/26 713/320 |
| 7,099,784 B2 * | 8/2006 | Spitaels .................... | H02J 3/14 702/132 |
| 7,340,617 B1 * | 3/2008 | Wewel .................. | G06F 1/3221 713/300 |
| 8,130,084 B2 * | 3/2012 | Cagno ..................... | H04B 1/74 307/1 |
| 2004/0268166 A1 * | 12/2004 | Farkas ..................... | G06F 1/206 713/320 |
| 2005/0028017 A1 * | 2/2005 | Janakiraman ........... | G06F 1/263 713/340 |
| 2006/0161794 A1 * | 7/2006 | Chiasson ................. | G06F 1/28 713/300 |
| 2009/0164824 A1 | 6/2009 | Langgood et al. | |
| 2012/0017102 A1 | 1/2012 | Turicchi, Jr. et al. | |

* cited by examiner

*Primary Examiner* — Mark Connolly
(74) *Attorney, Agent, or Firm* — Robert C. Kowert; Meyertons, Hood, Kivlin, Kowert & Goetzel, P.C.

(57) ABSTRACT

Techniques are described for managing power in a computing system using power controller(s). Power consumption information may be received from power sensors that measure power consumption of computing devices in a rack computing system, or that measure the power received or distributed by power distribution components such as power distribution units (PDUs) in the racks. A determination may be made whether the amount of power being currently consumed within a computing system exceeds a predetermined threshold. If so, control signal(s) may be sent to instruct the power controller(s) to alter characteristic(s), such as frequency, voltage, current, and so forth, of the power being supplied to one or more computing devices or other component(s). The power alteration may occur at one or more points in the power distribution system of one or more racks, such as at one or more PDUs, distribution circuits, breakers, and so forth.

20 Claims, 10 Drawing Sheets

POWER MANAGEMENT FOR DEVICES

BACKGROUND

Organizations such as online retailers, Internet service providers, search providers, financial institutions, universities, and other computing-intensive organizations often conduct computer operations from large scale computing facilities. Such computing facilities may house a large number of servers, storage devices, network appliances, and other computer equipment to store, process, and communicate data related to an organization's operations. A computer room of a computing facility may include any number of racks housing any number of servers, storage devices, other computing devices, and associated computer equipment. Such a large number of computing devices may consume a large amount of power during operation, and an organization may incur a high cost to pay for the power to operate a large number of computing devices. Accordingly, organizations seek ways to utilize power more efficiently or reduce power consumption.

Figure 1:
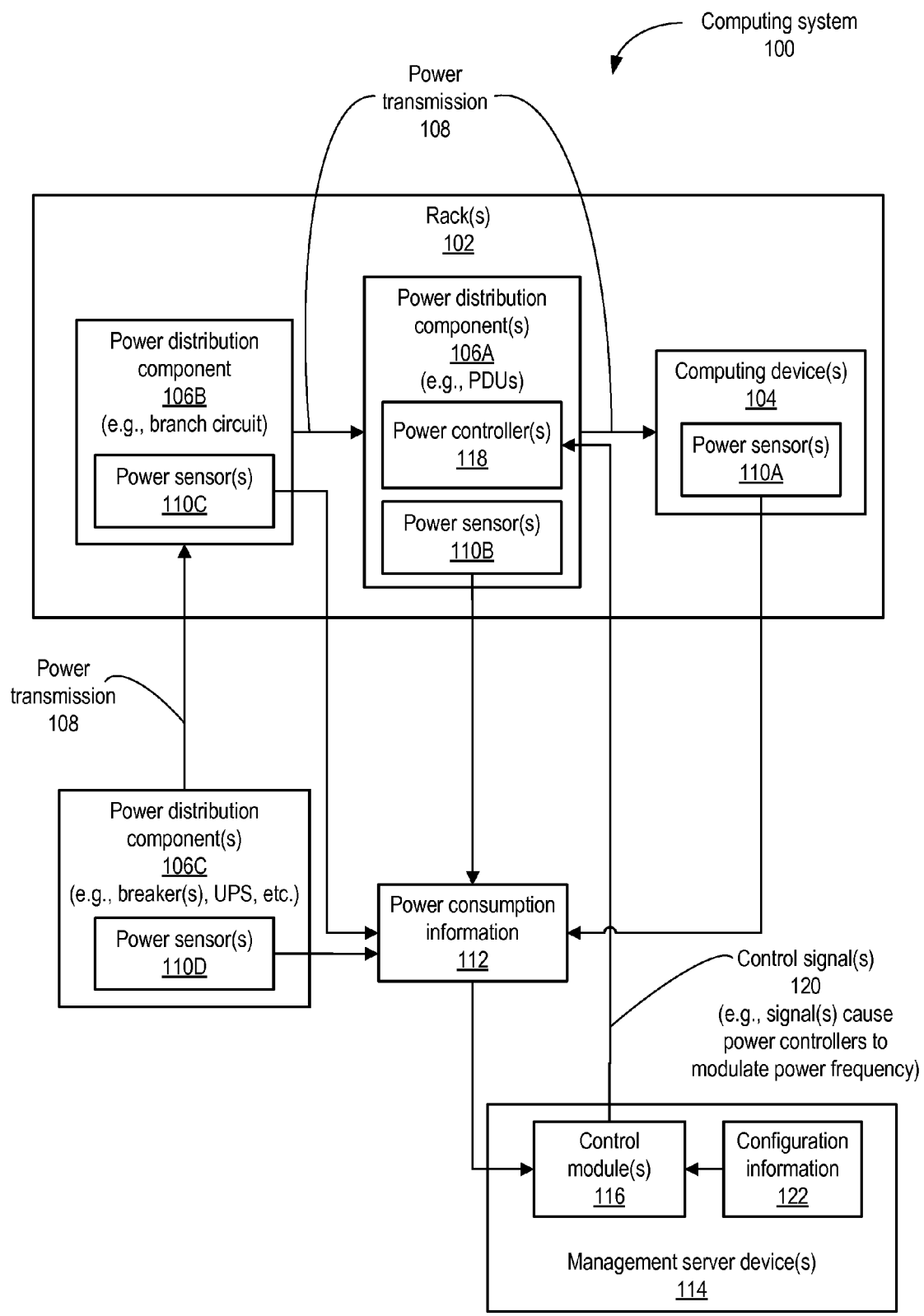
FIG. 1 is a schematic diagram illustrating an example computing system comprising one or more rack-mounted computing devices, in which characteristic(s) of the power supplied to the computing device(s) may be altered by one or more power controllers included in one or more power distribution unit(s).

The various embodiments described herein are susceptible to various modifications and alternative forms. Specific embodiments are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

This disclosure describes various embodiments of systems, apparatuses, methods, and computer-readable media for altering one or more characteristics (e.g., the frequency, current, voltage, and so forth) of power supplied to one or more computing devices, responsive to a determination that the power being consumed by the computing device(s) exceeds a predetermined threshold power consumption level. A computing system may include one or more computer rooms (e.g., server rooms) that each includes one or more racks. Each rack may include any number of rack-mounted computing devices, such as server computers, storage nodes (e.g., hard disk drives), networking controllers, and so forth. The computing system may also include any number of power distribution components, such as rack-mounted power distribution units (PDUs), power distribution or branch circuits, breakers, uninterruptible power supplies (UPSs), battery backup systems, power distribution panels, power cables, and so forth. In some embodiments, one or more of the power distribution components may be configured to measure the power being supplied by the power distribution component. In some cases, a computing device may be configured to determine the amount of power being currently consumed by the computing device. The power distribution component(s), or computing device(s), may generate power consumption information describing the amount of power being consumed at any level within the computing system.

The power consumption information may be accessed by control module(s) executing on management server device(s) that are external to the rack(s). In some embodiments, the control module(s) may execute on device(s) that are component of the rack(s). The control module(s) may analyze the power consumption information and determine whether the current power consumption for one or more computing devices is higher than a predetermined threshold power consumption level. If so, the control module(s) may emit control signals that cause one or more power controllers to alter the characteristic(s) of the power supplied one or more computing devices in the computing system. In some embodiments, the control signal(s) may be embedded or otherwise included in the power transmission itself, such as in a modulation carried over the 60 Hz (or other frequency)

signal of the alternating current (AC) power. Alternatively, the control signal(s) may be sent separately from the power transmission.

In some embodiments, the alteration of the characteristic of the power may itself carry information that components of the system interpret as a signal to further alter power downstream from the component(s) that receive the altered power. For example, the frequency of power sent to a power distribution component, such as a PDU, may be lowered or otherwise altered. A power controller included in the PDU may detect the altered frequency of the received AC power and, in response, alter the voltage or other characteristic of the power supplied by the PDU to lower the overall power supplied by the PDU. In this way, embodiments support the use of a control signal that is an alteration of a frequency or other characteristic of power.

In some embodiments, one or more power distribution components may include a power controller that is configured to alter a characteristic of the power, such as the frequency, voltage, or current of the power. By altering characteristic(s) of the supplied power, embodiments may lower the total power consumption of one or more computing devices. A power controller that alters the frequency of supplied power is referred to herein as a variable frequency power controller (VFPC). In some embodiments, one or more characteristic(s) of the power may be altered, and the power may continue to be supplied to component(s) of the computing system in the altered power characteristic state. Accordingly, in some embodiments the altering of a characteristic of the power may not include shutting off the power entirely or restoring power that was previously shut off.

Traditionally, a computing system may operate, during normal operations, within a power envelope that is lower than a maximum level. For example, a system of racks may be operable at a power level of 10 kVA per rack, but system operators may choose to configure the system such that it normally operates at a power level of 7.5 kVA per rack. Such lower-than-maximum power level may enable a traditionally configured computing system to tolerate power spikes or increases in power consumption caused by anomalous operating conditions, errors in software coding, peak usage conditions, or other scenarios. However, such a configuration may not enable a particular computing system to be used to its full capacity. Embodiments described herein may enable a computing system to be operated at its full capacity, or closer to its full capacity, than traditional configurations. For example, a rack may be arranged to consume up to 10 kVA of power. On detecting a spike or other increase in power consumption within the system, the control module(s) may emit control signal(s) to cause a throttling of the power consumption of computing device(s) by altering the frequency, current, voltage, or other characteristic(s) of the power. By providing a mechanism for adjusting to anomalously high power consumption conditions, embodiments enable a computing system to be operated at capacity and thus enable the more efficient or cost-effective usage of computing resources within a computing system.

In some embodiments, a computing device 104 may receive direct current (DC) power from a power supply that generates the DC power by transforming AC power received at the power supply. In response to high power consumption conditions in such a system, the control signal(s) may be sent to one or more computing devices to instruct the computing device(s) to reduce the number of operations being performed thereon, and thus lower the power consumption of the computing device(s).

Embodiments also support changing the power consumption in a system by altering the speed or other operating characteristics of one or more fans, blowers, or other cooling components within the system. Such alterations may be performed by changing the amount of DC power supplied to the cooling component(s), which may alter their speed. Alterations in cooling component operations may also be performed by sending control signal(s) to the cooling component(s) to cause the altering of the speed of the cooling component(s), in cases where the cooling component(s) include a variable frequency drive (VFD) or similar speed control component(s). In some cases where computing device(s) include cooling component(s), control signal(s) may be sent to the computing device(s) to instruct the computing device(s) to alter the speed of the cooling component(s) to reduce power consumption in the computing device(s).

In some embodiments, one or more computing device(s) such as servers may include a power controller that controls the power supplied to other components of the computing device. In such cases, the power controller may, in response to a control signal, alter characteristics of the power supplied to the other components, such as the voltage, frequency, or current of the power. Embodiments support changing characteristics of DC or AC power supplied to computing device(s), power distribution components, cooling components, or other components of a rack computing system, to control the overall amount of power consumed by the system.

As used herein, a "circuit board" may describe any board or plate that has one or more electrical conductors transmitting power, data, or signals from components on or coupled to the circuit board to other components on the board or to external components. In some embodiments, a circuit board is an epoxy glass board with one or more conductive layers therein. A circuit board may, however, be made of any suitable combination of materials.

As used herein, a "chassis" may describe any structure or element that supports another element or to which other elements may be mounted. A chassis may have any shape or construction, including a frame, a sheet, a plate, a box, a channel, or any combination thereof. In some embodiment, a chassis is made from one or more sheet metal parts. A chassis for a computer system may support circuit board assemblies, power supply units, data storage devices, fans, cables, and other components of the computer system.

As used herein, "computing" includes any operations that may be performed by a computer, such as computation, data storage, data retrieval, or communications.

As used herein, a "computer system" may include any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, a "module" includes a component or a combination of components physically coupled to one another. A module may include functional elements and systems, such as computer systems, circuit boards, racks, blowers, ducts, and power distribution units, as well as structural elements, such a base, frame, housing, or container.

As used herein, "mounting" a particular element on another element refers to positioning the particular element to be in physical contact with the other element, such that the other element provides one or more of structural support, positioning, structural load transfer, stabilization, shock absorption, some combination thereof, or the like with regard to the particular element. The mounted particular element may be positioned to rest upon one or more upper surfaces of the other element, independent of coupling the elements via one or more coupling elements. In some embodiments, mounting the particular element to another element includes coupling the elements such that the other element provides one or more of structural support, positioning, structural load transfer, stabilization, shock absorption, some combination thereof, or the like with regard to the particular element.

As used herein, "horizontal" or "primarily horizontal," also interchangeably referred to hereinafter as "horizontally-oriented," means at least more horizontal than vertical. In the context of an installed element or device, "horizontal," "primarily horizontal," or "horizontally-oriented" includes an element or device for which its installed width is greater than its installed height. In some embodiments, a horizontal or horizontally-oriented element or device is fully horizontal.

As used herein, "vertical" or "primarily vertical," also interchangeably referred to hereinafter as "vertically-oriented," means at least more vertical than horizontal. In the context of an installed element or device, "vertical," "primarily vertical," or "vertically-oriented" includes an element or device for which its installed height is greater than its installed width. In the context of a mass storage device, "vertical," "primarily vertical," or "vertically-oriented" includes a mass storage device that is installed such that the installed height of the mass storage device is greater than the installed width of the mass storage device. In some embodiments, a vertical or vertically-oriented element or device is fully vertical.

As used herein, a "rack" may include a rack, container, frame, or other element or combination of elements that can contain or physically support one or more computer systems.

As used herein, "room" may include a room or a space of a building. As used herein, "computer room" means a room of a building in which computer systems, such as rack-mounted servers, are operated.

As used herein, a "space" describes a space, area or volume.

As used herein, "shelf" may include any element or combination of elements on which an object can be rested. A shelf may include, for example, a plate, a sheet, a tray, a disc, a block, a grid, or a box. A shelf may be rectangular, square, round, or another shape. In some embodiments, a shelf may be one or more rails.

As used herein, "shock absorbing," as applied to a supporting element for another element, means that the supporting element absorbs mechanical energy or at least partially mitigates one or more of shock or vibration loads. A shock-absorbing material may be elastic, viscoelastic, viscous, or combinations thereof.

FIG. 1 is a schematic diagram illustrating an example computing system 100 according to embodiments. The computing system 100 may include any number of racks 102, which may also be described as rack computer systems, server racks, and so forth. In some embodiments, the rack(s) 102 may be housed in one or more computer rooms (e.g., server rooms). The computer room(s) may be physically located in any number of locations. The rack(s) 102 may include any number of (e.g., rack-mounted) computing devices 104. The computing device(s) 104 may be configured to perform operations for an online retail service, an Internet service provider, a search provider, a financial institutions, a university, a social network provider, other types of businesses, or any other organization that employs computing resources. The computing device(s) 104 may include, but are not limited to, one or more servers, mass storage devices (e.g., hard disk drives), network controllers, control devices, and so forth.

The computing system 100 may include a power distribution system comprising any number of power distribution components that provide electrical power to the computing device(s) 104 or other components included in the computing system 100. For example, the power distribution system may include one or more power distribution components 106A, such as PDUs, that are mounted in the rack(s) 102. The power distribution component(s) 106A may be electrically coupled to the computing device(s) 104 to supply power to the computing device(s) 104. In some embodiments, the power distribution system may include one or more power distribution components 106B. Such power distribution component(s) 106B may be mounted or otherwise included in the rack(s) 102, and may be arranged to provide power to the power distribution component(s) 106A (e.g., the rack-mounted PDU(s)). For example, the power distribution component(s) 106B may include a branch circuit that distributes power to multiple PDUs in a rack 102. The power distribution system may also include one or more power distribution component(s) 106C that are external to the rack(s) 102. For example, a power distribution system may include a breaker that supplies power to the branch circuits of multiple racks 102. A power distribution system may include any number of power distribution components 106, including but not limited to one or more uninterruptible power supplies (UPSs), PDUs, transformers, automatic transfer switches (ATSs), other switching devices, switchgear, circuit breakers, battery backup systems, and so forth.

The power distribution system may receive electrical power from one or more power feeds, including one or more utility power sources, generators, batteries, or other power sources. In some embodiments, the power distribution system may include infrastructure such as one or more power lines, power busways, bus bars, power transmission lines, power cables, and so forth. The various power distribution component(s) 106 may be electrically coupled to one another, either directly or indirectly, to provide power transmission 108 between the power distribution component(s) 106 and to the computing device(s) 104. In some embodiments, breaker(s) in one or more computer rooms may distribute power to a plurality of racks 102. A branch circuit in each of the racks 102 may distribute the power to a plurality of rack-mounted PDUs, and each PDU may provide power to a plurality of rack-mounted computing devices 104.

In some embodiments, the computing system 100 may include one or more power sensors 110 that measure or otherwise determine the amount of power being consumed by various components of the computing system 100. For example, one or more computing devices 104 may include, as a subcomponent, a power sensor 110A configured to measure an amount of power being currently used by the computing device 104. The power sensor 110A may generate power consumption information 112 that describes the amount of power that has been, or is currently being, consumed by the computing device 104. In some cases, as shown in FIG. 1, the power sensor 110A may be a sub-component of a computing device 104. Alternatively, the power sensor 110A may be at least partly external to the computing device 104 and arranged to measure the power being supplied to the computing device 104. In some embodiments, a Basic Input/Output System (BIOS), an operating system (OS), firmware, or other software of the computing device 104 may be configured to determine the power usage of the computing device 104 and generate the power consumption information 112 describing the power usage.

In some embodiments, one or more power distribution components 106 may include a power sensor 110. For example, a power distribution component 106A (e.g., a PDU), may include a power sensor 110B that measures the amount of power that is received or distributed by the power distribution component 106A. The power sensor 110B may output power consumption information 112 that describes the amount of power received or distributed by the power distribution component 106A. In cases where a power distribution component 106A provides power to multiple computing devices 104, the power sensor 110B may generate power consumption information 112 that describes the individual power usage of one or more of the computing devices 104 fed by the power distribution component 106A. The power sensor 110B may be included as a sub-component of the power distribution component(s) 106A, as shown in FIG. 1, or may be at least partly external to the power distribution component(s) 106A.

In some embodiments, a power distribution component 106B (e.g., a branch circuit in a rack 102), may include a power sensor 110C that measures the amount of power that is received or distributed by the power distribution component 106B. The power sensor 110C may output power consumption information 112 that describes the amount of power received or distributed by the power distribution component 106B. In cases where a power distribution component 106B provides power to multiple power distribution components 106A, the power sensor 110C may generate power consumption information 112 that describes the power distributed to individual ones of the power distribution components 106A fed by the power distribution component 106B. The power sensor 110C may be included as a sub-component of the power distribution component(s) 106B, as shown in FIG. 1, or may be at least partly external to the power distribution component(s) 106B.

In some embodiments, a power distribution component 106C (e.g., a breaker), may include a power sensor 110D that measures the amount of power that is received or distributed by the power distribution component 106C. The power sensor 110D may output power consumption information 112 that describes the amount of power received or distributed by the power distribution component 106C. In cases where a power distribution component 106C provides power to multiple power distribution components 106B in multiple racks 102, the power sensor 110D may generate power consumption information 112 that describes the power distributed to individual ones of the power distribution components 106B fed by the power distribution component 106C. The power sensor 110D may be included as a sub-component of the power distribution component(s) 106C, as shown in FIG. 1, or may be at least partly external to the power distribution component(s) 106C. In some embodiments, one or more of the power distribution components 106 may include firmware or may be otherwise configured to measure the power received or distributed by a power distribution component 106 and output power consumption information 112 described the amount of power received or distributed.

In some embodiments, the computing system 100 may include one or more management server devices 114 that execute one or more control modules 116. The management server device(s) 114 may be physically located in proximity to one or more racks 102, such as in a computer room. Alternatively, the management server device(s) 114 may be located remotely from the rack(s) 102 in other location(s). Although FIG. 1 depicts the management server device(s) 114 as external to the rack(s) 102, embodiments are not so limited. In some embodiments, the management server device(s) 114 may mounted, or otherwise included, in the rack(s) 102. In some embodiments, the control module(s) 116 may include a management console or management software configured to manage a plurality of rack computer systems with any number of computing devices 104. For example, the control module(s) 116 may include a Supervisory Control and Data Acquisition (SCADA) system configured to enable one or more operators to (e.g., remotely) control the rack computer systems.

The control module(s) 116 may access the power consumption information 112 generated by one or more power sensor(s), power distribution component(s) 106, or computing device(s) 104. The control module(s) 116 may analyze the power consumption information 112 and determine whether the computing system 100, or any portion of the computing system 100, is consuming an amount of power that exceeds a threshold power consumption level. If so, the control module(s) 116 may emit, or cause to be emitted, one or more control signals 120 that are sent to one or more power controllers 118 in the computing system 100. The control signal(s) 120 may instruct the power controller(s) 118 to alter one or more characteristics of the power being supplied by one or more power distribution components 106. In some embodiments, the power controller(s) 118 may include one or more VFPCs that are configured to modulate or otherwise alter the frequency of the alternating current (AC) power provided by one or more power distribution components 106. The control signal(s) 120 may also instruct the power controller(s) 118 to alter other characteristic(s) of the supplied power, such as the voltage or the current. By lowering the frequency or other characteristic(s) of the power, the power controller(s) 118 may lower the total power supplied by power distribution component(s) 106, thus enabling the computing system 100 to adjust to a spike or other increase in power consumption.

In some embodiments, the control module(s) 116 may determine a control group of components for which the power characteristics are to be altered. For example, the control module(s) 116 may determine one or more computing device(s) 104 to which the power is to be altered. The control module(s) 116 may then determine which power distribution component(s) 106 provide power to the control group, and the control signal(s) 120 may be sent to the power controller(s) 118 that are arranged to alter the power supplied by the determined power distribution component(s) 106. For example, if a control group includes a subset of computing devices 104 in a rack 102, the control signal(s) 120 may be sent to the particular PDU(s) that supply power to the control group. Such an example is illustrated in FIG. 1. If the control group is determined to include all the computing device(s) 104 in a particular rack 102, or in multiple racks 102, the control signal(s) 120 may be sent to the power distribution component(s) 106 that provide power to the rack(s) 102 in the control group. In some embodiments, the control module(s) 116 may access configuration information 122 that describes the various power distribution component(s) 106 that distribute power, directly or indirectly, to one or more computing devices 104. The control module(s) 116 may employ the configuration information 122 to determine the particular power distribution component(s) 106 to receive the control signal(s) 120, to alter the power sent to the control group.

Figure 2:
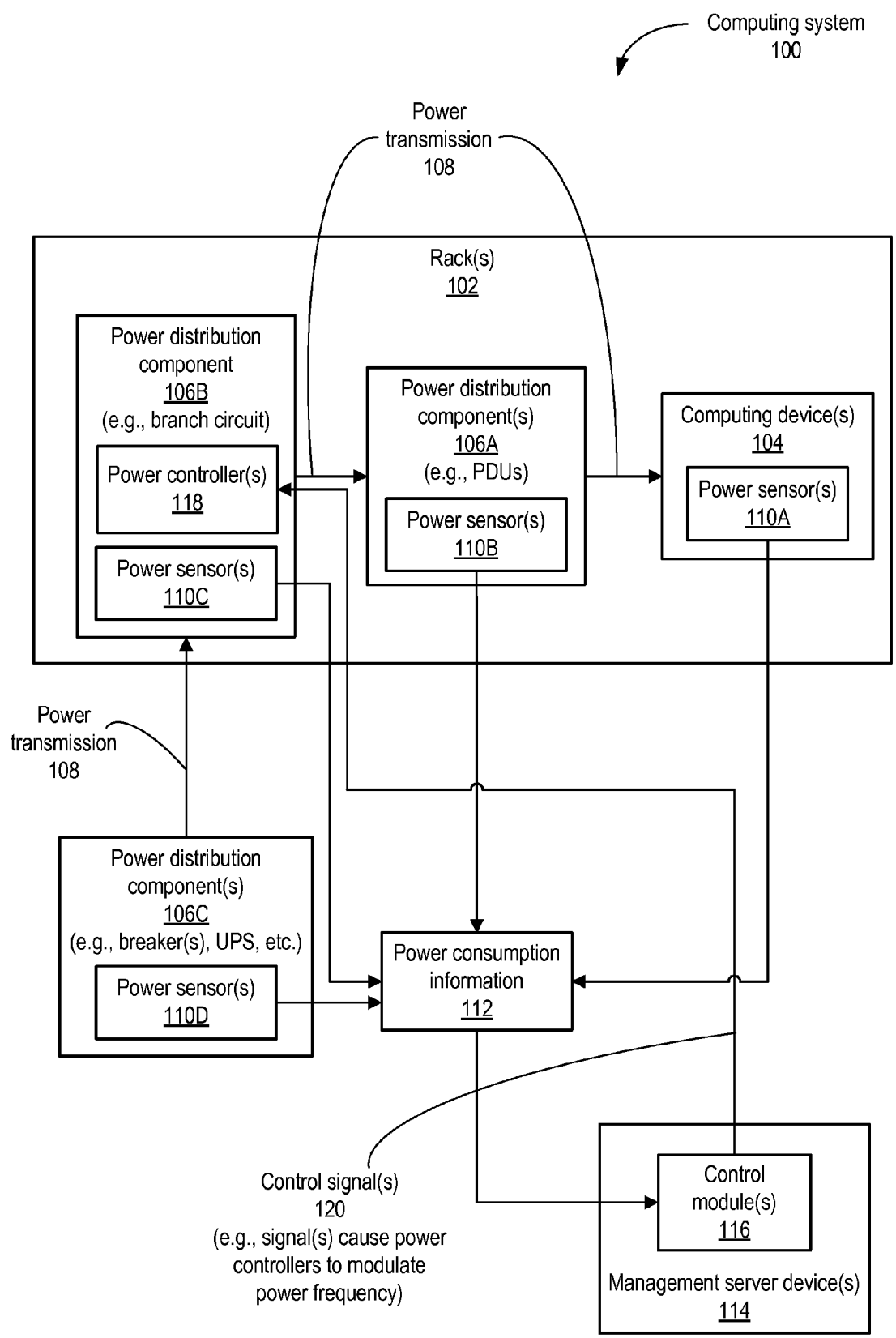
FIG. 2 is a schematic diagram illustrating an example computing system comprising one or more rack-mounted computing devices, in which characteristic(s) of the power supplied to the computing device(s) may be altered by one or more power controllers included in power distribution component(s) that supply power to one or more power distribution unit(s).
Figure 3:
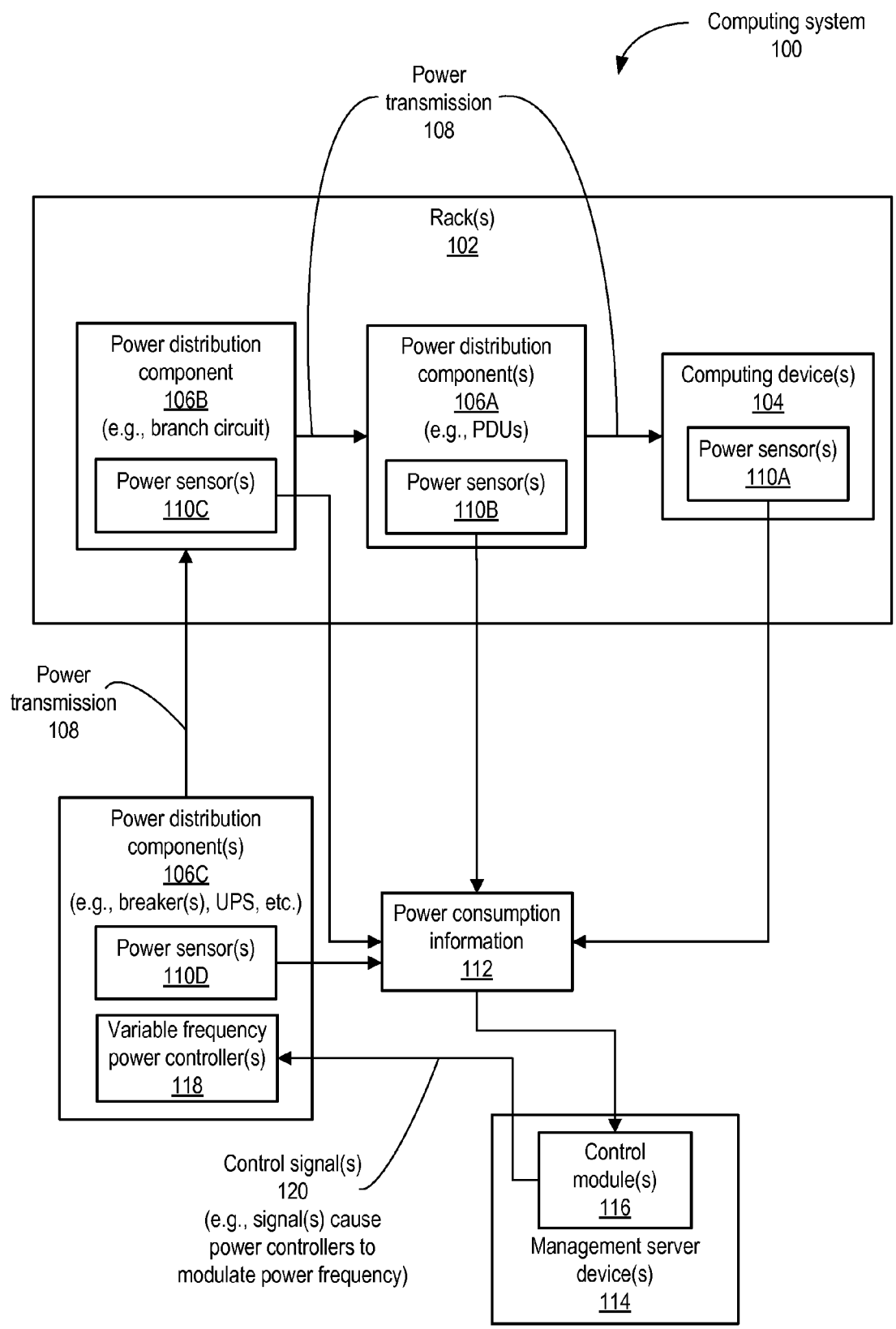
FIG. 3 is a schematic diagram illustrating an example computing system comprising one or more rack-mounted computing devices, in which characteristic(s) of the power supplied to the computing device(s) may be altered by one or more power controllers included in one or more power distribution component(s) that are external to the rack(s).

Embodiments support the inclusion of power controller(s) 118 in any number of power distribution components 106 of the computing system 100, to alter the power that is distributed at any level (e.g., PDU, branch circuit, breaker, etc.) of the computing system 100. For example, as shown in FIG. 1, the power controller(s) 118 may be included as sub-component(s) of the power distribution component(s) 106A (e.g., PDU(s)) in the rack(s) 102, to enable the modulation or other characteristic alteration of the power distributed by the power distribution component(s) 106A. FIG. 2 illustrates embodiments in which the power controller(s) 118 are included as sub-component(s) of the power distribution component(s) 106B in one or more racks 102, to enable the modulation or other characteristic alteration of the power distributed by the power distribution component(s) 106B. FIG. 3 illustrates embodiments in which the power controller(s) 118 are included as sub-component(s) of the power distribution component(s) 106C external to the racks 102, to enable the modulation or other characteristic alteration of the power distributed by the power distribution component(s) 106C to one or more racks 102. Embodiments support the arrangement of power controller(s) 118 in any number or any combination of the power distribution components 106A, 106B, and 106C. The various elements of FIGS. 1-3 may be configured similarly to, or may perform similar operations to, like-numbered elements of FIGS. 1-3. Although FIGS. 1-3 depict various power controller(s) 118 as sub-component(s) of power distribution component(s) 106, embodiments are not so limited. In some embodiments, one or more power controller(s) 118 may be at least partly external to the power distribution component(s) 106 and arranged to alter the characteristic(s) of power provided to or from the power distribution component(s) 106.

In some embodiments, as shown in the examples of FIGS. 1-3, the control signal(s) 120 may be sent separately from the power transmission 108 to instruct the power controller(s) 118 to alter characteristic(s) of power sent via power transmission 108. Alternatively, the control signal(s) 120 may be embedded or otherwise included in the power transmission 108 itself, such as in a modulation on top of the power transmission. In some embodiments, the alteration of the characteristic of the power may itself carry information that components of the system may interpret as a signal to further alter power downstream from the component(s) that receive the altered power. For example, the frequency of power received at a power distribution component 106A, such as a PDU, may be lowered or otherwise altered by a power controller 118 upstream. A power controller 118 included in the power distribution component 106A may detect the altered frequency of the received AC power and, in response, alter the voltage or other characteristic of the (e.g., DC) power supplied by the power distribution component 106A to computing device(s) 104 or other component(s) of the computing system 100.

Although not depicted in FIGS. 1-3, the various elements of FIGS. 1-3 may communicate with one another over one or more networks such as local area networks (LANs) or wide area networks (WANs). Such network(s) may be wired or wireless, and may employ any technology or communication protocol. For example, the control module(s) 116 may receive or otherwise access the power consumption information 112 or one or more networks, and may send the control signal(s) 120 over one or more networks to the power controller(s) 118. The computing system 100 may also include other components not shown in FIGS. 1-3. For example, the computing system 100 may include one or more cooling components such as fans, blowers, compressed air systems, cooling fluid circulation systems, heat exchangers, heat sinks, or other elements that operate to remote waste heat generated by components of the computing system 100. The various components of the computing system 100 may include network interfaces, Input/Output (I/O) interface(s), or other components that enable communications between the components of the computing system 100. Components may be communicatively coupled via communications cable(s), control signal line(s), network switching device(s), console switching device(s), or other infrastructure.

Figure 4:
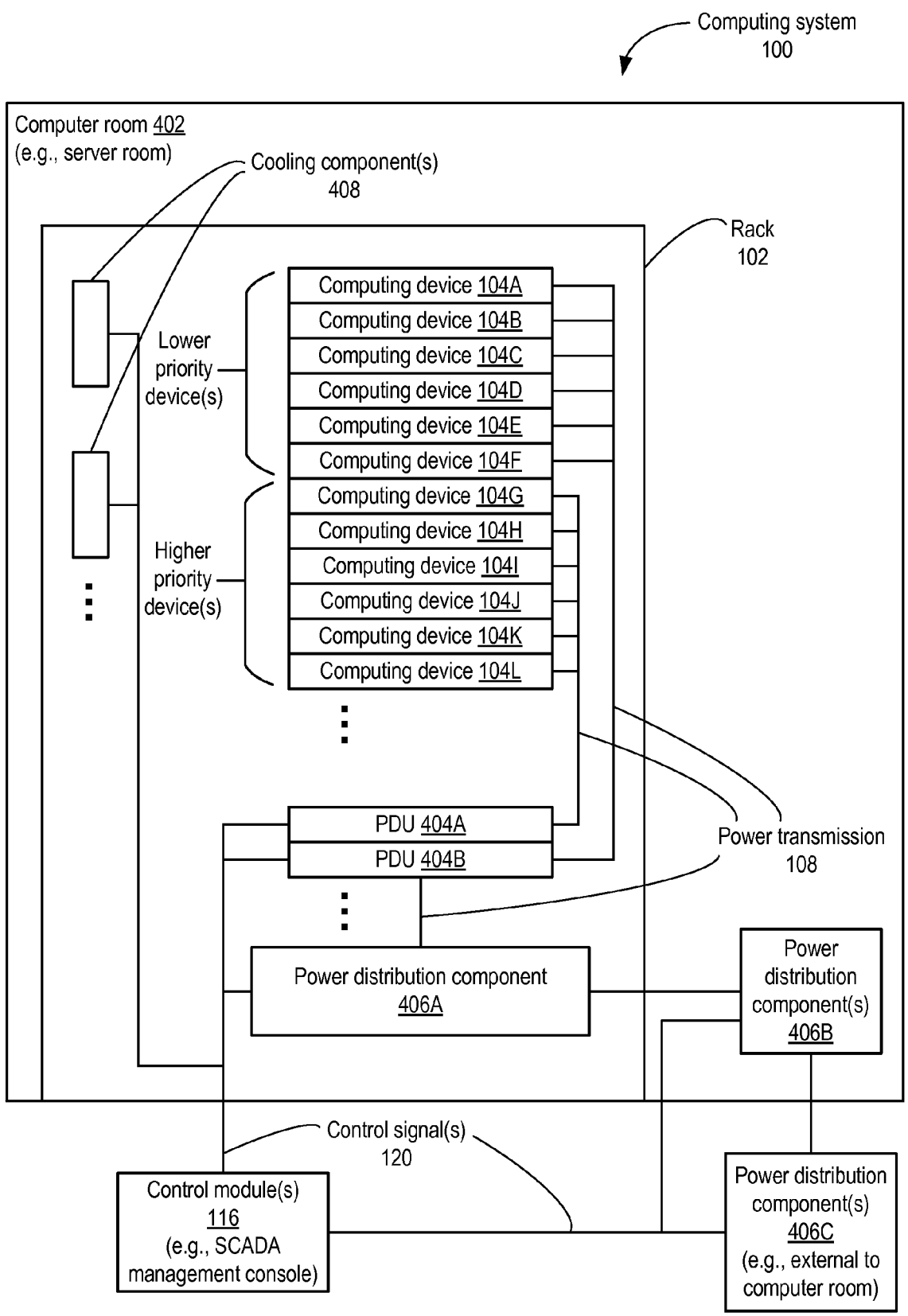
FIG. 4 is a schematic diagram illustrating an example rack computer system including one or more rack-mounted computing devices, in which an external control module emits signal to cause the alteration of power supplied by power distribution unit(s) or other power distribution components that may be in the rack or external to the rack.

FIG. 4 illustrates an example of a computing system 100, including one or more computer rooms 402 housing one or more racks 102. A computing system 100 may include any number of computer rooms 402 that each houses any number or racks 102. As shown in the example of FIG. 4, a rack 102 may include any number of components mounted to the rack 102. Such components may include one or more computing devices 104 and one or more PDUs 404, or other types of power distribution components 406A such as branch circuit(s) that distribute power to multiple PDUs 404. Computer room(s) 402 may also include other power distribution component(s) 406B that are external to the rack(s) 102, such as breaker(s), UPS(s), and so forth. In some cases, a power distribution system that supplies power for a computing system 100 may include one or more power distribution components 406C that are external to the computer room(s) 402, such as power infrastructure elements that control power distribution within a building or to a building. The various power distribution components 406 and the PDU(s) 404 may be electrically coupled to enable power transmission 108 between components and to the computing device(s) 104.

In some embodiments, the computing devices 104 may each be classified into one of multiple priority levels. For example, as shown in FIG. 4, a first set of computing devices 104 may be classified as higher priority and a second set of computing devices 104 may be classified as lower priority. In some cases, the higher priority devices may be mission critical or otherwise more important to the operations of the computing system 100 than the lower priority devices. In some embodiments, the control group of computing devices 104 to which the power is altered may be determined based at least in part on the priority of the devices. For example, the control module(s) 116 may determine that the power is to be altered to the lower priority devices and not to the higher priority devices. Accordingly, the control signal(s) 120 may be sent to a PDU 404B that distributes power to the lower priority devices and not sent to a PDU 404A that distributes power to the higher priority devices. Alternatively, the control signal(s) 120 may be sent to the power distribution component 406A that feeds the PDUs 404A and 404B, and the control signal(s) 120 may indicate that the power distribution component 406A is to alter the power sent to the PDU 404B and not alter the power sent to the PDU 404A. Embodiments support the classification of computing devices 104 into any number of priority levels. In some embodiments, the priority level of one or more computing devices 104 may be indicated in the configuration information 122. In some cases, a computing device 104 may be able to operate under power with a lowered frequency or otherwise altered characteristic(s), but may exhibit aberrant behavior or errors under the altered power. Accordingly, embodiments may preferentially alter the power supplied to lower priority devices to ensure that higher priority (e.g., mission-critical) devices are able to continue operating normally.

The control module(s) 116 may also employ other criteria to determine which computing devices 104 or other components to include in the control group for power alteration. In some embodiments, the control module(s) 116 may determine that those computing devices 104 consuming the most power, or exhibiting the largest increase in power consumption during a time period, are to be included in the control group. In some cases, the control group may be determined at least in part manually by one or more operators. Alternatively, the control group may be determined automatically based on various criteria including current power consumption, device priority, or other considerations.

In some embodiments, as shown in the example of FIG. 4, the computing system 100 may include one or more cooling component(s) 408. Such cooling component(s) 408 may include fans, blowers, or other component(s) that cause or alter the movement of air in proximity to component(s) of the computing system 100. Cooling component(s) 408 may also include other types of components that alter the temperature of at least a portion of the computing system 100. For example, cooling component(s) 408 may include heat sinks, or devices that employ coolant fluid flow to cool nearby component(s). In some embodiments, the cooling component(s) 408 may be component(s) of the rack 102, as shown in FIG. 4. In such cases, the cooling component(s) 408 may be mounted within a fan door or fan cabinet at the back of the rack 102, and arranged to cause the movement of air across one or more computing device(s) 104 or other component(s) mounted within the rack 102. Alternatively, the cooling component(s) 408 may be in a computer room 402 but external to a rack 102, and may be configured to move air in proximity to the rack 102. In some embodiments, one or more computing device(s) 104 may include, as a subcomponent, a cooling component such as a fan.

In some embodiments, the overall power consumption within the computing system 100 may be controlled by controlling the power supplied to cooling component(s) 408. For example, a cooling component 408 may include, as a subcomponent, a VFD that changes the fan speed or other operational characteristic of the cooling component 408 in response to a control signal 120. In some embodiments, the voltage or other characteristic of (e.g., DC) power supplied to the cooling component 408 may be varied to change the fan speed or other operational characteristic of a cooling component 408. In cases where a cooling component is included as a subcomponent of a computing device 104, the firmware, BIOS, or other software running on the computing device 104 may be configured to alter the fan speed in response to a control signal 120. In some embodiments, the computing system 100 may include one or more temperature sensors such as thermometers, thermocouples, and so forth. The temperature within the computing system 100 may be monitored by the control module(s) to ensure that the temperature stays within a range to enable adequate operation of the component(s) of the computing system 100. If the temperature exceeds the operational range, additional control signal(s) 120 may be sent to cause one or more cooling components to increase fan speed or otherwise cool the system.

Figure 5:
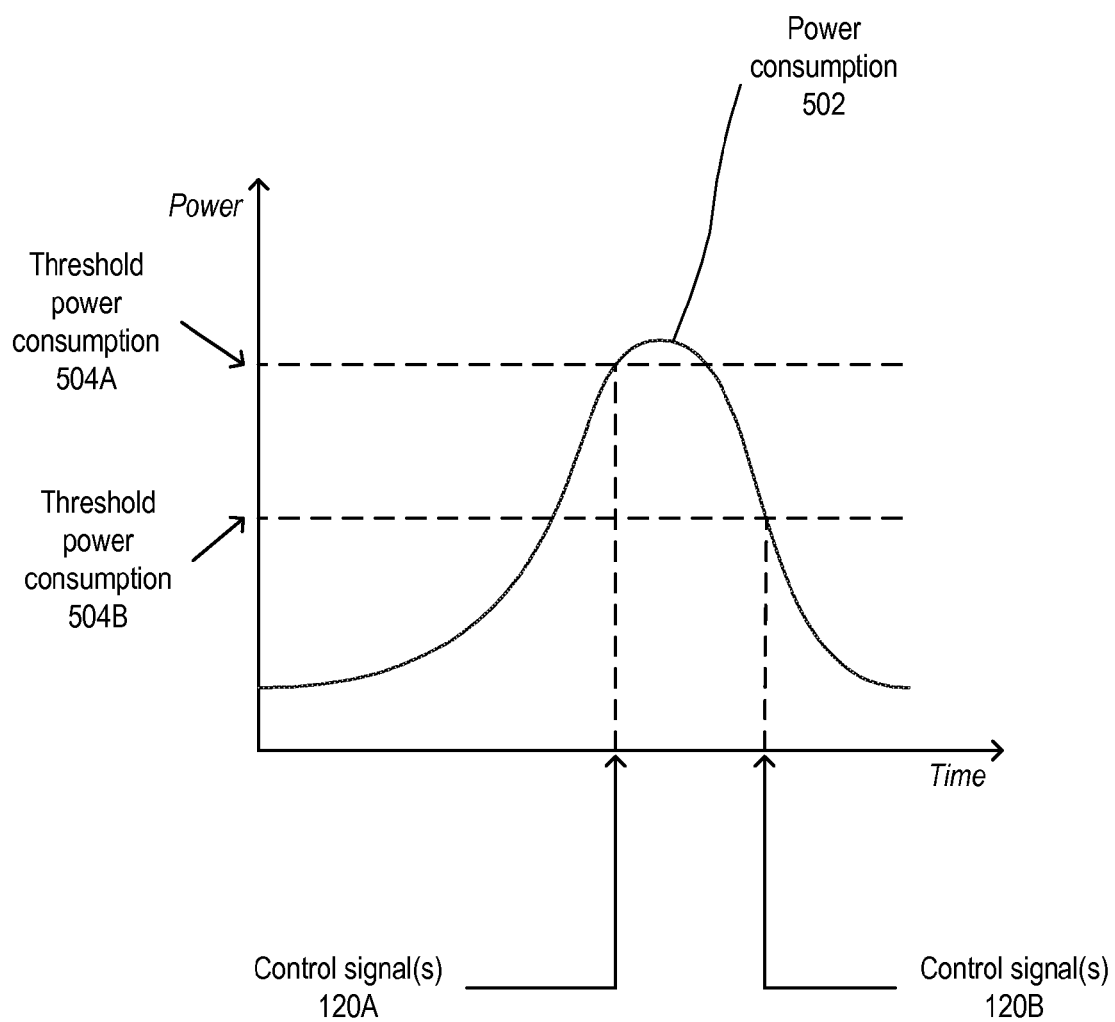
FIG. 5 is a graph illustrating an example of sending control signal(s) to alter the characteristic(s) of power supplied by computing device(s) in response to a determined power consumption being above or below a threshold, according to embodiments.

FIG. 5 is a graph illustrating an example of altering the frequency or other characteristic(s) of power provided to a control group in response to detecting a spike or other increase in power consumption in a computing system 100. The graph depicts power consumption 502, as a function of time, for one or more components of a computing system 100. The power consumption 502 may be determined based on the power consumption information 112, which may be updated with any frequency to enable a determination of the change in power consumption 502 over time. The power consumption 502 may be that of any component, or any combination of components, in a computing system 100, such as one or more computing devices 104 or one or more power distribution components 106.

As shown in FIG. 5, the power consumption 502 for one or more components may be monitored over a period of time. The power consumption 502 may be monitored for a single component such as a computing device 104, for multiple computing devices 104 in a rack 102, for an entire rack 102, for a particular set of computing devices 104 supplied by a particular power distribution component 106, and so forth. The power consumption 502 may also be monitored for other component(s) of the computing system 100, such as control device(s), cooling component(s), power distribution component(s), and so forth.

Based on the monitored power consumption 502, a high power consumption event may be determined to be occurring in the computing system 100, as exhibited by the power consumption information 112 for one or more components. In some embodiments, a high power consumption event may be characterized by the power consumption 502 exceeding a predetermined power consumption threshold level 504A for one or more components. In some embodiments, a high power consumption event may be characterized by the power consumption 502 exhibiting a rate of change that is greater than a predetermined threshold rate of change in the power consumption 502. For example, the rate of change in the power consumption 502 over time may be calculated, e.g., as a delta or as the slope of the plotted power consumption 502 shown in FIG. 5. The determined rate of change may be compared to a threshold rate of change, and a high power consumption event may be detected if the determined rate of change exceeds (e.g., is faster than) the threshold rate of change. Embodiments may also employ other information to determine whether a high power consumption event is occurring. The identification of high power consumption event(s) may be performed by control module(s) 116 based on an analysis of the power consumption information 112.

If it is determined that a high power consumption event is occurring, the control module(s) 116 may emit one or more first control signals 120A to cause an alteration of at least one characteristic of the power distributed to a control group, thus attempting to mitigate or counter the high power consumption event by lowering the total power consumption of the control group.

After the first control signal(s) 120A are sent, the control module(s) 116 may continue to monitor the power consumption 502 based on updated or current power consumption information 112. If the power consumption 502 falls below a threshold power consumption level 504B, the control module(s) 116 may emit one or more second control signals 120B. The control signal(s) 120B may at least partly reverse the power alteration caused by the control signal(s) 120A. For example, if the control signal(s) 120A instructed power controller(s) 118 to lower the power frequency or voltage, the control signal(s) 120B may instruct the same power controller(s) 118 to increase the power frequency or voltage to its value prior to the sending of the control signal(s) 120A. In some embodiments, the threshold power consumption level 504B may be lower than the threshold power consumption level 504A, to account for a possible hysteresis exhibited by the power consumption of component(s).

Embodiments support the use of any number and value of threshold power consumption levels 504 to determine when control signal(s) 120 are to be sent. In some embodiments, the threshold power consumption level(s) 504 may be determined based at least in part on a power budget that has been determined for a computing system 100 of one or more computer rooms 402 and one or more racks 102. In such cases, the threshold power consumption level(s) 504 may correspond to the power budget, or may be set at a predetermined percentage (e.g., 95%) of the budget.

Figure 6:
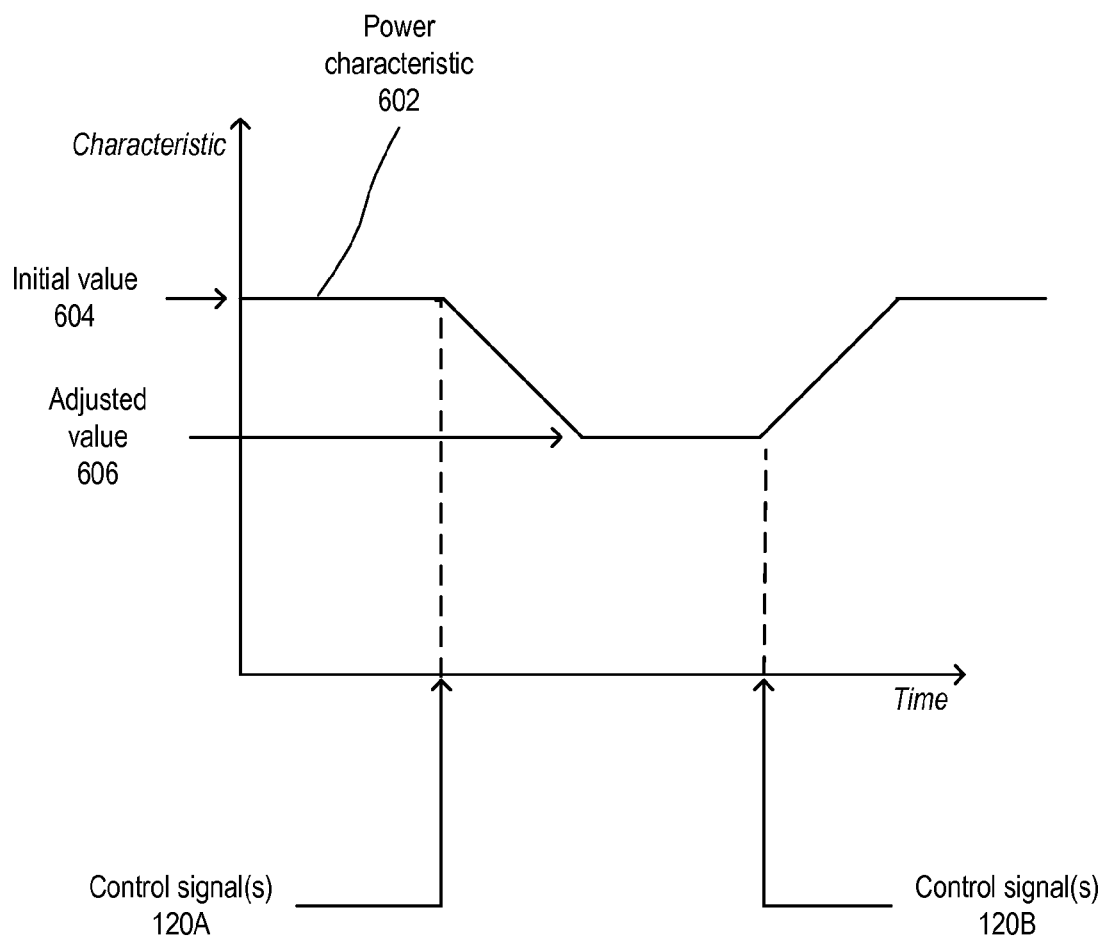
FIG. 6 is a graph illustrating an example of altering frequency characteristic of power over time, according to embodiments.

FIG. 6 is a graph illustrating an example of how a power characteristic 602, such as frequency, voltage, or current, may be altered over time to affect the power consumption 502 within a computing system 100. Initially, e.g., under normal operating conditions, the power supplied to one or more components of the computing system 100 may be characterized by an initial value 604 of the frequency, voltage, current, or other characteristic. On detecting a high power consumption event, as described with reference to FIG. 5, the control module(s) 116 may emit the control signal(s) 120A to cause a change in the value of the characteristic. In some embodiments, as shown in the example of FIG. 6, the power controller(s) 118 may lower the value of the power characteristic 602 from the initial value 604 to an adjusted value 606 that is lower than the initial value 604. Alternatively, the power controller(s) 118 may increase the value of the power characteristic 602. In some embodiments, as shown in the example of FIG. 6, the adjustment of the power characteristic 602 may occur over a period of time. For example, the value of the power characteristic 602 may decrease linearly from the initial value 604 to the adjusted value 606 over a period of time. Alternatively, the value of the power characteristic 602 may be lowered in some other manner, such as via a step down from the initial value 604 to the adjusted value 606.

After the adjusted value 606 is reached, the control module(s) 116 may continue monitoring the power consumption in the computing system 100 based on updated power consumption information 112. On determining that the high power consumption event has ended, e.g., that the power consumption 502 has dropped below a threshold power consumption level 504B, the control module(s) 116 may emit the control signal(s) 120B to instruct the power controller(s) 118 to restore the power characteristic 602 to its initial value 604. As shown in FIG. 6, the power characteristic 602 may be increased gradually (e.g., linearly) over a period of time until it is restored to the initial value 604. Alternatively, the power characteristic 602 may be increased in another manner, such as stepped up from the adjusted value 606 to the initial value 604.

In some cases, a computing device 104 or other component of the computing system 100 may be configured to be operable within a range of power characteristics. For example, a component may be configured to operate optimally when powered by AC power at a frequency of 60 Hz. However, the component may be able to operate when powered by AC power at a frequency as low as 52 Hz. Accordingly, a component may be able to operate when powered by AC power within a frequency range between 52 Hz and 60 Hz, where the component operates more optimally at higher frequencies close to or at 60 Hz. Accordingly, in at least one embodiment the initial frequency 604 may be 60 Hz and the adjusted frequency 606 may be 52 Hz, or any value between 60 Hz and 52 Hz.

In some cases, a component may be able to operate at frequencies lower than 60 Hz for a certain period of time (e.g., 5 minutes) before the component, or software running on the component, begins to exhibit errors or anomalous behavior related to clock speed or other issues. Accordingly, in some embodiments, the control module(s) 116 may keep track of the amount of time during which one or more components have been operating under the altered power characteristic, and may send the control signal(s) 120B before the elapsed time at the altered power characteristic surpasses a predetermined time limit for particular components. In some embodiments, a calibration may have been performed to determine how long a particular device or class of devices is able to operate under the altered power characteristic before failures occur.

In some embodiments, in response to a high power consumption event in the computing system 100, the control module(s) 116 may cause the power to be adjusted to different control groups of computing devices 104 during different time periods. For example, a first control group may be operated under altered power during a first period of time and restored to an optimal power characteristic (e.g., 60 Hz) before the devices in the first control group begin to fail. Then a second, different, control group may be operated under altered power during a second period of time that is at least partly non-overlapping with the first period of time. In this way, embodiments may provide a sort of rolling brownout of different sets of components to response to a high power consumption event. Although examples herein may describe adjusting the frequency of power sent to components of a computing system 100, embodiments also support the altering of other characteristics of the supplied power, such as voltage, current, and so forth.

Figure 7:
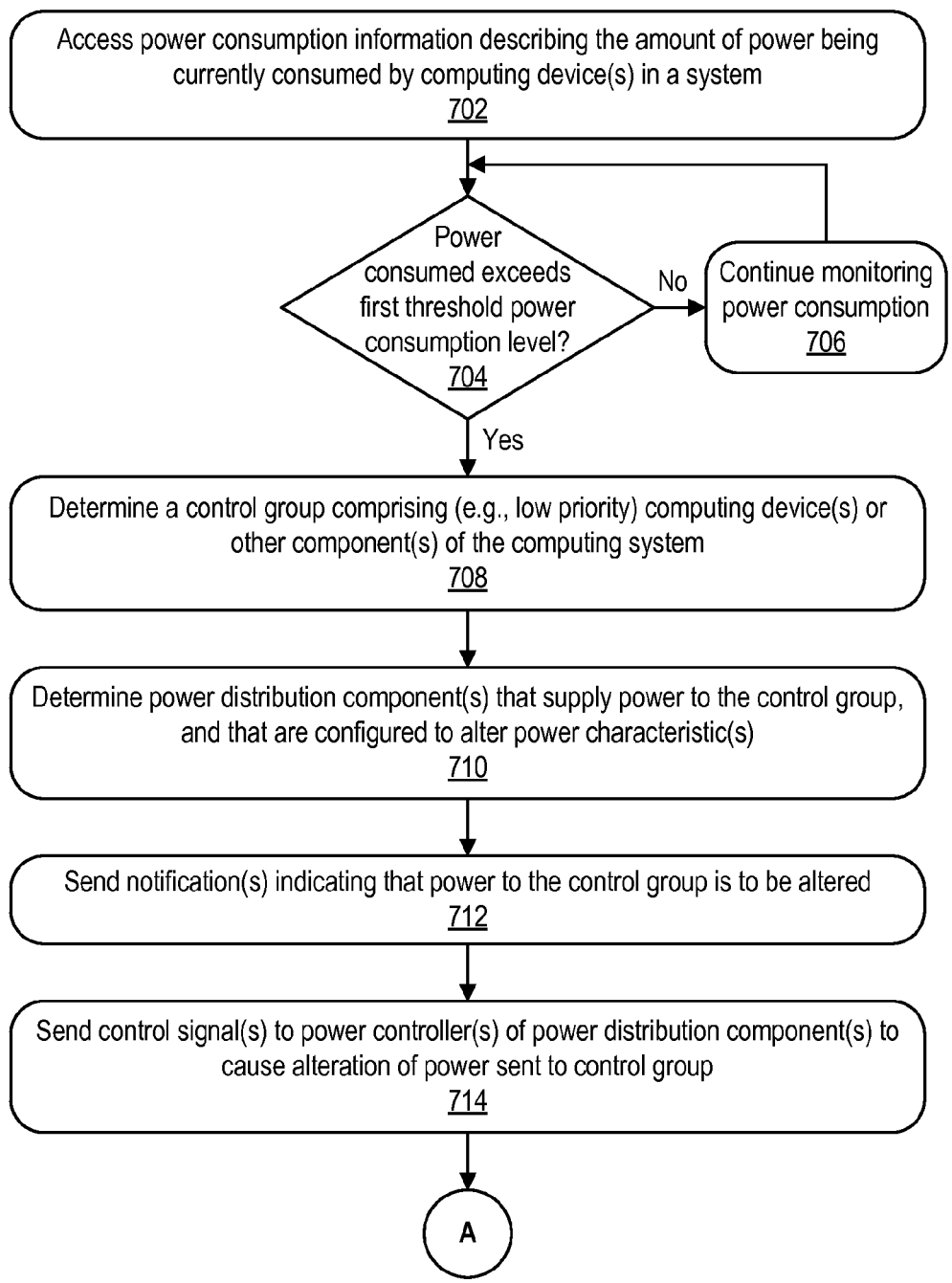
FIG. 7 is a flow diagram illustrating, according to embodiments, an example process for altering characteristic(s) of power supplied to computing device(s).
Figure 8:
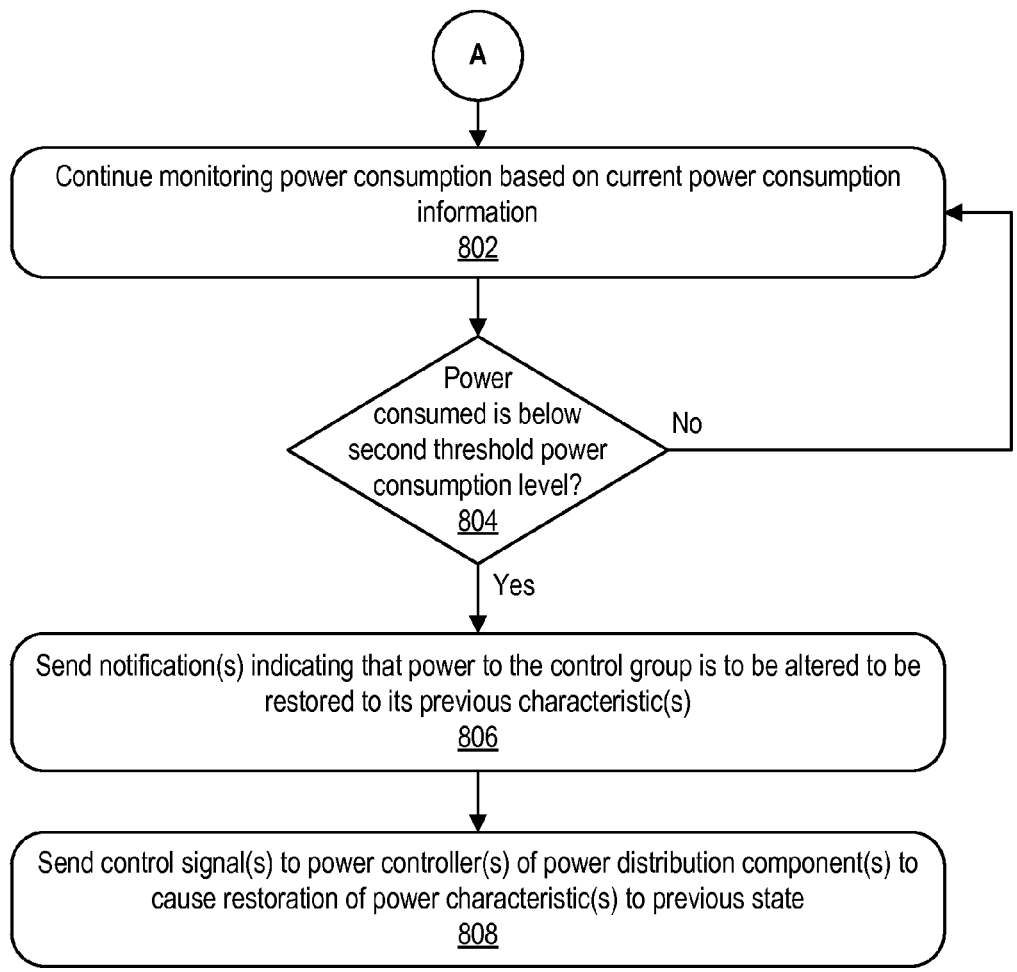
FIG. 8 is a flow diagram illustrating, according to embodiments, a continuation of an example process for altering characteristic(s) of power supplied to computing device(s).

FIGS. 7 and 8 depict flow diagrams illustrating an example process for altering power characteristics in response to a high power consumption event in a computing system 100. Operations of the process may be performed by one or more of the control module(s) 116 executing on the management server device(s) 114, or other software modules operating on other devices including but not limited to the power distribution component(s) 106, the computing device(s) 104, or the power controller(s) 118.

At 702, the power consumption information 112 may be accessed. As described above, the power consumption information 112 may describe an amount of power consumed by one or more computing devices 104 or other component(s) in the computing system 100. In some embodiments, the power consumption information 112 may indicate an amount of power being currently consumed, or recently consumed, by computing device(s) 104 or other component(s).

At 704, a determination is made whether the power consumed exceeds a first threshold power consumption level (e.g., the threshold power consumption level 504A). If not, the process may proceed to 706 and continue monitoring the power consumption in the computing system 100. The process may periodically (e.g., with a predetermined frequency) check whether the current power consumption exceeds a threshold level.

If it is determined that the power consumption exceeds the first threshold power consumption level, the process may proceed to 708. At 708, a control group is determined comprising one or more computing devices 104 or other component(s) of the computing system 100. As described above, various criteria may be employed to determine the computing device(s) 104, or other component(s), to include in the control group. For example, lower priority computing device(s) 104 may be selected to include in the control group. In some cases, the control group may include computing device(s) 104 that are consuming power above the threshold level. The control group may include any combination of individual computing device(s) 104, sets of computing device(s) 104 (e.g., that are fed by particular PDU(s) or other power distribution component(s) 106), or one or more racks 102 of computing devices 104. A control group may also include cooling component(s), controller(s), or other component(s).

At 710, one or more power distribution components 106 are identified that supply power to the control group and that are configured to alter power characteristic(s). In some cases, the determined power distribution component(s) 106 may include a power controller 118 such as a VFPC or may be configured such that a power controller 118 is able to alter the power supplied by the power distribution component(s) 106. In some embodiments, the power distribution component(s) 106 may be determined based at least partly on the configuration information 122.

At 712, in some embodiments one or more notifications may be sent to indicate that the power supplied to the control group is to be altered. In some embodiments, the notification(s) may be sent to operators or other individuals responsible for managing or maintaining the computing system 100. The notification(s) may also be sent to processes that execute on the computing device(s) 104 of the control group or that access other processes or data present on the computing device(s) 104 of the control group. The notification(s) may enable process(es) to modify their behavior based on a potential change in the operations of the computing device(s) 104. For example, on receiving a notification that a computing device 104 is to operating in an altered power state, a process may being using another computing device 104 to access data, request operations, or perform other tasks.

At 714, the control signal(s) 120A may be sent to the power controller(s) 118 that are included in, or otherwise associated with, the power distribution component(s) 106 identified at 710. The control signal(s) 120A may instruct the power controller(s) 118 to alter, or begin altering, one or more characteristics of the distributed power. The process may then continue as described with reference to FIG. 8.

At 802, in some embodiments the power consumption may be monitored after the control signal(s) 120A are sent, to determine whether the high power consumption event continues.

At 804, a determination is made whether the consumed power has dropped below a second threshold power consumption level 504B. If not, the process may return to 802 and continue monitoring power consumption.

If the power consumption has dropped below the second threshold power consumption level 504B, the process may proceed to 806. At 806, in some embodiments notification(s) may be sent to indicate that the power distributed to the control group is to be altered again to restore the power to its initial state (e.g., the initial value). The notification(s) may be sent to individuals, processes, or devices as described with reference to 712.

At 808, the control signal(s) 120B may be sent to the power controller(s) 118, to instruct the power controller(s) 118 to restore the distributed power to its previous state (e.g., the initial value). The process may then continue monitoring the power consumption in the computing system 100 for subsequent high power consumption events.

Figure 9:
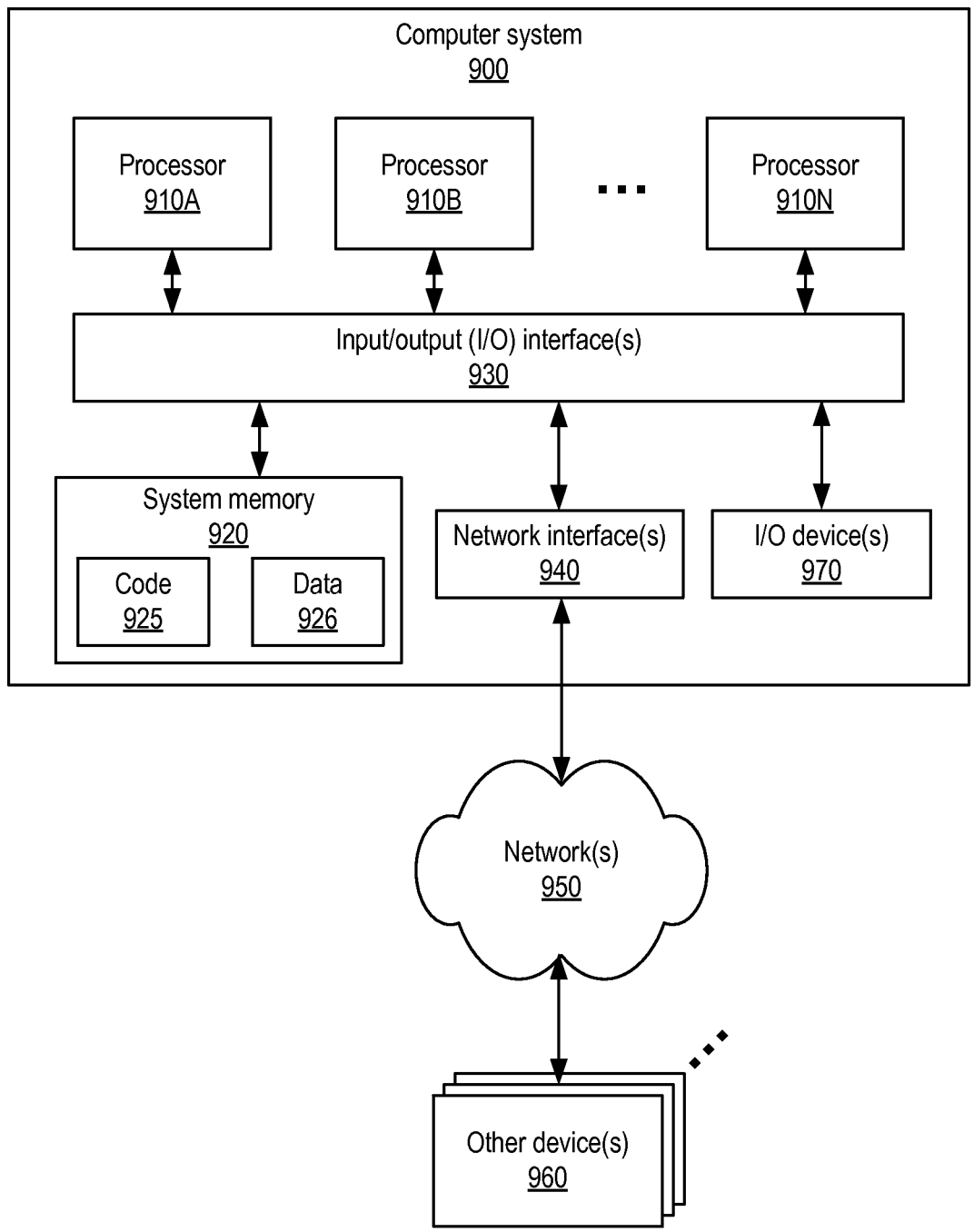
FIG. 9 is a block diagram illustrating an example computer system that may be employed in embodiments.

FIG. 9 is a block diagram illustrating an example computer system 900 configured to implement at least a portion of the power management described herein according to various embodiments. The computer system 900 may include any number of computing devices, and may execute or otherwise include any number of software modules such as applications, processes, libraries, interfaces, application programming interfaces (APIs), and so forth. For example, computer system 900 may be configured to implement one or more of the management server device(s) 114, the computing device(s) 104, the power distribution component(s) 106, or the power controller(s) 118. The computer system 900 may include any type of computing device including but not limited to: a rack-mounted computing device, a personal computer system, a desktop computer, a laptop or notebook computer, a tablet computer, an electronic book (e-book) reader, a wearable computer, an implanted computer, a mainframe computer system, a distributed computing device (e.g., cloud server), a handheld computer, a workstation, a network computer, a consumer device, an automotive computer, a home entertainment device, a smart appliance, a storage device, a telephone, a remote control, a game controller, a gaming system, a mobile telephone, a smartphone, or any other type of computing device.

The computing system 900 may include one or more physical computing devices. The computing system 900 may also include one or more of a virtual computing environment, a hypervisor, an emulation, or a virtual machine executing on one or more physical computing devices. In some embodiments, the computing system 900 may comprise a cluster, cloud, farm, or other grouping of multiple devices that coordinate operations to provide load balancing, failover support, parallel processing capabilities, shared storage resources, or other aspects.

Computer system 900 may include one or more processors 910 coupled to a system memory 920 via one or more input/output I/O interfaces 930. One or more of the processor(s) 910 may include multiple cores, which may be configured to execute single-threaded or multi-threaded code. In various embodiments, computer system 900 may be a uniprocessor system including one processor 910, or a multiprocessor system including multiple processors 910 (e.g., two, four, eight, or any other number). The processor(s) 910 may include any processor(s) capable of executing instructions. For example, in various embodiments, the processor(s) 910 may include general-purpose or embedded processor(s) implementing any of a variety of instruction set architectures (ISAs), such as the x86, PowerPC, SPARC, or MIPS ISAs, or any other ISA. In multiprocessor systems, each of processors 910 may implement the same ISA. Alternatively, different ones of the processors 910 may implement different ISAs.

The computer system 900 may include one or more system memories 920, described herein as system memory 920, configured to store one or more of code 925 or data 926 such that the code 925 and the data 926 are accessible by the processor(s) 910. The system memory 920 may comprise one or more computer-readable storage media that include one or more of the following: an electronic storage medium, a magnetic storage medium, an optical storage medium, a quantum storage medium, a mechanical computer storage medium, a solid state storage medium, and so forth. The system memory 920 may be implemented using any memory technology, including but not limited to one or more of the following: read-only memory (ROM), random access memory (RAM), static RAM (SRAM), dynamic RAM (DRAM), Rambus DRAM (RDRAM), extended data out (EDO) RAM, synchronous DRAM (SDRAM), double data rate SDRAM (DDR SDRAM), electrically erasable programmable ROM (EEPROM), flash memory, non-volatile memory, volatile memory, or any other type of memory. The system memory 920 may be incorporated into the computer system 900. In some cases, at least a portion of the system memory 920 may be external to the computer system 900 and accessible via the network interface(s) 940 or the I/O device(s) 970.

The system memory 920 may include the code 925. The code 925 may include executable instructions that are executable by processor(s) 910 to implement the embodiments described herein. The code 925 may implement one or more executable software modules, such as applications, programs, processes, libraries, interfaces, APIs, scripts, routines, and so forth. The code 925 may be in a compressed or uncompressed form. The code 925 may be in an encrypted or unencrypted form. The code 925 may include any number of instructions that may be employed to program a computing device, or other electronic device, to perform the operations described herein. The code 925 may be arranged in any format and according to any language. In some embodiments, the code 925 may include machine-executable binary instructions that are configured to execute on the processor(s) 910, the instructions generated by compiling, linking, or otherwise processing source code written in any programming language. In some embodiments, the code 925 may include intermediate language instructions (e.g., bytecodes) that execute within a runtime application such as a Java™ Virtual Machine (JVM), C#™ runtime, or any other runtime, interpreter, virtual machine, or execution engine running on the computer system 900. In some embodiments, the code 925 may include instructions written in a scripting language or interpreted language, such as JavaScript™, ActiveScript™, VBScript™, Perl™, and so forth. In such cases, the code 925 may execute within a runtime, interpreter, virtual machine, scripting engine, or other process that executes on the computer system 900.

The code 925 may include instructions to perform operations as described above. The code 925 may also include instructions to implement at least one operating system OS that executes on the computer system 900. The at least one OS may include one or more of the following: any version of the UNIX™ OS; any version of the Linux™ OS; any version of iOS™ or OSX™ from Apple Corp. of Cupertino, Calif., USA; any version of Windows™ or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The system memory 920 may include data 926 employed during operations of the computer system 900. The data 926 may include at least a portion of one or more of the power consumption information 112 or the configuration information 122. The data 926 may be stored in any format. In some embodiments, at least a portion of the data 926 may be stored externally to the computer system 900, on one or more other devices or storage media that may communicate with the computer system 900 via the network interface(s) 940, the I/O interface(s) 930, or the I/O device(s) 970. The system memory 920 may include persistent storage such as one or more hard drives, tape drives, solid state memory, other mass storage devices, or any other persistent storage device. The system memory 920 may also include active memory, physical memory, or virtual memory that is employed by processes executing on the computer system 900. The system memory 920 may include cache memory.

The system memory 920 may comprise one or more non-transitory storage media that store information such as one or both of the code 925 or the data 926. Non-transitory storage media may store information in any arrangement, and using any storage technology, such that the stored information is computer-readable, i.e., readable by a machine such as a computing device. Non-transitory storage media may include any media that is configured to store information such that the stored information persists for at least a minimum duration relative to the operations described herein. Non-transitory storage media may include any media that is transportable as a physical object. Embodiments may include software comprising one or both of the code 925 or the data 926 stored on the system memory 920 that comprises one or more non-transitory storage media. Such software may be used to program the computer system 900, or other electronic devices, to perform one or more operations according to various embodiments.

Embodiments may also include software that is transmitted in a transitory form as an electromagnetic transmission, optical transmission, acoustical transmission, or any other type of signal or communication. Such software may be communicated using any communication protocol over the Internet or any other communications network, using a wired or wireless communication path. In such cases, the software may be received using the network interface(s) 940 and employed to program the computer system 900, or other electronic devices, to perform one or more operations according to various embodiments.

The I/O interface(s) 930 may be configured to coordinate I/O traffic between the processor(s) 910, the system memory 920, and any peripheral devices accessible to the computer system 900 through the network interface(s) 940 or other peripheral interface(s). In some embodiments, the I/O interface(s) 930 may perform protocol, timing or other data transformations to convert data from one component (e.g., the system memory 920) into a format suitable for use by another component (e.g., the processor(s) 910). In some embodiments, the I/O interface(s) 930 may include support for devices attached through various types of peripheral buses that support any bus standard such as any variant of the Peripheral Component Interconnect (PCI) bus standard or the Universal Serial Bus (USB) standard. In some embodiments, the function of I/O interface(s) 930 may be split into two or more separate components, such as a north bridge and a south bridge. Moreover, in some embodiments at least some of the functionality of I/O interface(s) 930, such as an interface to the system memory 920, may be incorporated directly into the processor(s) 910.

The computer system 900 may include one or more network interfaces 940 coupled to the I/O interface(s) 930. The one or more network interfaces 940 may be employed by the various components or software of the computer system 900 to communicate with other systems and/or components over one or more communications networks 950. The network interface(s) 940 may include one or more network interface controllers (NICs), transceiver devices, or other types of network communications devices configured to send and receive communications over the network(s) 950.

The computer system 900 may employ the network interface(s) 940 to communicate and exchange data with one or more other devices 960 over the network(s) 950. The network interface(s) 940 may support one or more wireless networking protocols such as any version of the Institute of Electrical and Electronics Engineers (IEEE) 802.11 standard or other wireless networking standard. The network interface(s) 940 may also support communication via any wired data networks, such as Ethernet networks. The network interface(s) 940 may also support communication via any telecommunications or telephony network such as analog voice networks or digital fiber communications networks, via storage area networks such as Fibre Channel storage area networks (SANs), or via any other suitable type of network and/or protocol.

In some embodiments, the network interface(s) 940 may be configured to enable communication between the computer system 900 and one or more I/O devices 970, or between the computer system 900 and external (e.g., remote) storage device(s). The I/O device(s) 970 may include one or more data input devices such as a keyboard, a keypad, a mouse, a pen, a game controller, a touch input device, an audio input device (e.g., a microphone), a gestural input device, a haptic input device, an image or video capture device (e.g., a camera), or other data input devices. In some cases, the I/O device(s) 970 may include one or more data output devices such as a display, an audio output device (e.g., a speaker), a printer, a haptic output device, and so forth.

The I/O device(s) 970 may be components of all the devices included in the computer system 900 or may be components of different devices that comprise the computer system 900. The I/O device(s) 970 may be physically incorporated with the computer system 900. In some embodiments, one or more of the I/O device(s) 970 may be externally placed relative to the computer system 900 and may communicate with the computer system 900 using a wired or wireless connection, such as over the network interface(s) 940. In various embodiments, the computer system 900 may include more, fewer, or different components than those illustrated in FIG. 9.

The network(s) 950 may include public networks such as the Internet, private networks such as an institutional or personal intranet, or some combination of private and public networks. The network(s) 950 may include any type of wired or wireless network, including but not limited to local area networks (LANs), wide area networks (WANs), wireless WANs (WWANs), wireless LANs (WLANs), mobile communications networks (e.g., 3G, 4G, etc.), and so forth. The various computing systems, devices, and processes described herein may employ the network(s) 950 for communication. Such communications may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol. The network(s) 950 may be employed for communications between any of the components of the computing system 100.

Figure 10:
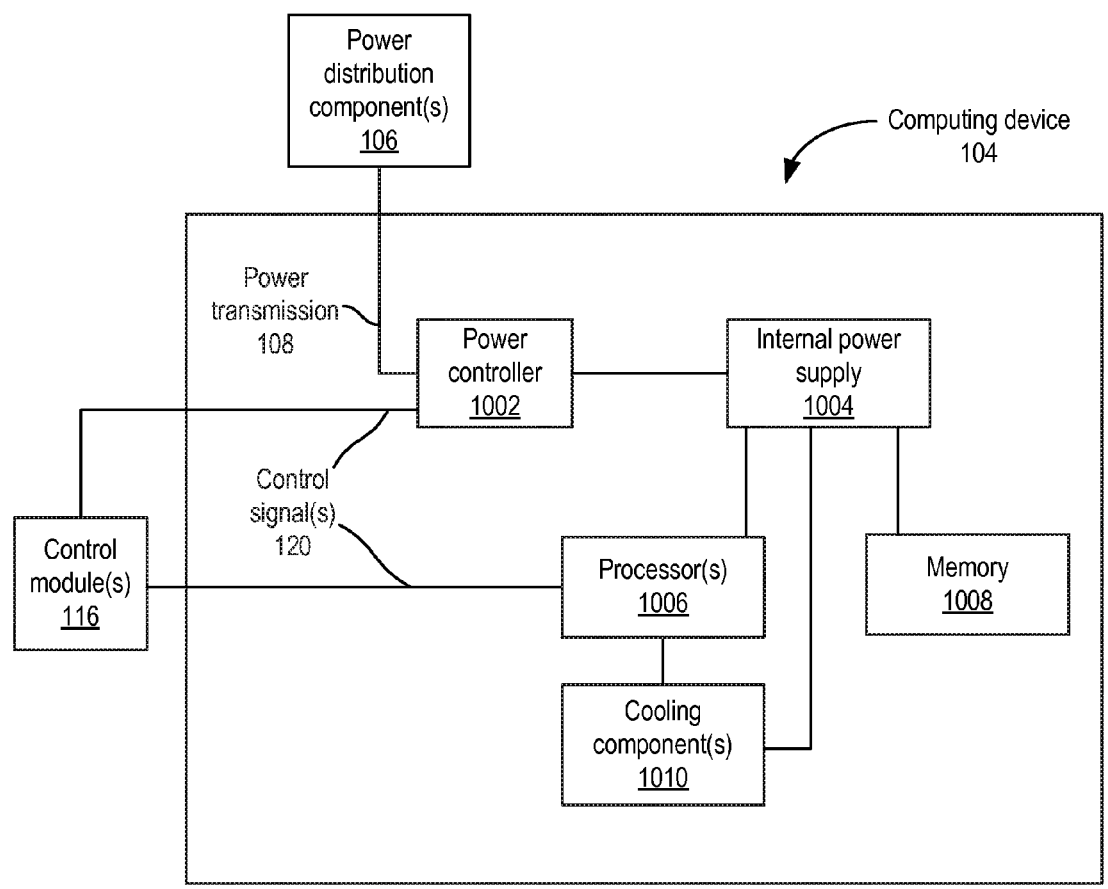
FIG. 10 is a schematic diagram illustrating an example computing device configured to enable power control, according to embodiments.

FIG. 10 is a schematic diagram illustrating an example of a computing device 104 configured to enable power control, according to embodiments. In some embodiments, as shown in the example of FIG. 10, a computing device 104 may include a power controller 1002 that is configured to alter one or more characteristics, such as voltage, current, frequency, and so forth, supplies via power transmission 108 from the power distribution component(s) 106 to the computing device 104. The power controller 1002 may be configured to alter the power based on control signal(s) 120 from the control module(s) 116 as described above, and provide the power to an internal power supply 1004. In some embodiments, the power controller 1002 may be a subcomponent of the internal power supply 1004, or the internal power supply 1004 itself may be configured to alter the power characteristics in response to control signal(s) 120. The internal power supply 1004 may provide the power to other components of the computing device 104, such as processor(s) 1006, memory 1008, cooling component(s) 1010, and so forth.

In some embodiments, the processor(s) 1006 may execute firmware, BIOS, or other software that is configured to alter the power consumed by the computing device 104 in response to control signal(s) 120. For example, in response to control signal(s) 120, the processor(s) 1006 may instruct the cooling component(s) 1010 to alter a fan speed or other operational characteristic to reduce the amount of power consumed by the cooling component(s) 1010.

The various methods, processes, and routines illustrated in the figures and described herein represent example embodiments. The methods may be implemented as software, as hardware, as manual operations, or as any combination thereof. The order of operations performed by any method, process, or routine described herein may be changed, and one or more operations may be added, reordered, combined, omitted, or modified. The operations may be performed serially or in parallel. In cases where the methods, process, and routines described herein are implemented as computer programs, any number of instances of these programs may be executed on any number of separate computer systems or on the same computer system. Although certain operations may be described herein as performed by particular devices, software programs, processes, or entities, embodiments are not limited to these examples. A variety of alternative embodiments will be understood by those having ordinary skill in the art.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system comprising:
   a rack;
   a plurality of computing devices mounted in the rack;
   at least one power distribution unit (PDU) mounted in the rack, wherein the at least one PDU is electrically coupled to distribute power from a power feed to at least one of the plurality of computing devices;

a power controller included as a component of the at least one PDU, wherein the power controller is configured to alter a frequency characteristic of the power; and a control module communicatively coupled to the power controller, wherein the control module is configured to emit a signal that causes the power controller to alter the frequency characteristic of the power as the PDU continues to supply power to the at least one of the plurality of computing devices.

2. The system of claim 1, wherein the plurality of computing devices includes one or more of a server device or a data storage device.

3. The system of claim 1, wherein the control module is external to the rack.

4. The system of claim 1, wherein:
the plurality of computing devices includes at least one high priority computing device and at least one low priority computing device;
the at least one high priority computing device is configured to operate with higher availability than the at least one low priority computing device; and
the control module is configured to emit the signal that causes the power controller to alter at least one characteristic of the power supplied by the at least one PDU to the at least one low priority computing device.

5. The system of claim 1, further comprising:
at least one power sensor configured to generate power consumption information describing an amount of power used by the plurality of computing devices; and
wherein the control module is further configured to:
access the power consumption information; and
emit the signal responsive to the power consumption information indicating that the amount of power exceeds a threshold power consumption level.

6. A system comprising:
a plurality of computing devices;
at least one power distribution component that is electrically coupled to the plurality of computing devices to distribute power from a power feed to the plurality of computing devices;
a power controller configured to alter a frequency characteristic of the power; and
a control module communicatively coupled to the power controller, wherein the control module is configured to emit a signal that causes the power controller to alter the frequency characteristic of the power as the power distribution component continues to supply power to the at least one of the plurality of computing devices.

7. The system of claim 6, wherein the power controller is configured to alter one or more of a frequency, a current, or a voltage of power supplied by the at least one power distribution component to the at least one of the plurality of computing devices.

8. The system of claim 6, wherein:
the system further comprises one or more cooling components; and
the signal causes an alteration in operation of the one or more cooling components to reduce the power consumed by the one or more cooling components.

9. The system of claim 6, wherein:
the system further comprises a rack in which the plurality of computing devices are mounted;
the at least one power distribution component comprises:
a plurality of power distribution units (PDUs) that are mounted in the rack to supply power to the plurality of computing devices in the rack; and a branch circuit configured to supply power to the plurality of PDUs; and
the power controller is included as a component of the branch circuit to alter at least one characteristic of the power supplied to at least one of the plurality of PDUs.

10. The system of claim 6, wherein:
the system further comprises a rack in which the plurality of computing devices are mounted;
the at least one power distribution component comprises at least one power distribution unit (PDU) mounted in the rack to supply power to the plurality of computing devices in the rack; and
the power controller is included as a component of the at least one PDU to alter at least one characteristic of the power supplied to at least one of the plurality of computing devices.

11. The system of claim 6, wherein the signal is included in a transmission of the power to the at least one power distribution component.

12. The system of claim 6, wherein:
the signal comprises a change in a frequency of alternating current (AC) power provided to the at least one power distribution component; and
the power controller is further configured to, responsive to the change in the frequency, alter a voltage of direct current (DC) power supplied by the at least one power distribution component to the at least one of the plurality of computing devices.

13. A method comprising:
accessing power consumption information describing an amount of power being consumed by a plurality of computing devices;
determining that the amount of power exceeds a threshold power consumption level for the plurality of computing devices; and
responsive to the amount of power exceeding the threshold power consumption level, sending a signal to at least one power controller that is arranged to control at least one power distribution component distributing power from a power feed to the plurality of computing devices, the signal causing the at least one power controller to alter a frequency characteristic of the power as power continues to be provided by the at least one power distribution component to at least one of the plurality of computing devices.

14. The method of claim 13, wherein the signal causes the at least one power controller to alter one or more of a frequency, a current, or a voltage of power provided by the at least one power distribution component to the at least one of the plurality of computing devices.

15. The method of claim 14, wherein the signal causes the at least one power controller to alter the frequency characteristic from a first value to a second value during a time period.

16. The method of claim 13, wherein:
the threshold power consumption level is a first threshold power consumption level;
the signal is a first signal; and
the method further comprises:
accessing updated power consumption information describing the amount of power being consumed by the plurality of computing devices after the sending of the first signal;
determining that the amount of power is below a second threshold power consumption level, the second threshold power consumption level being lower than the first threshold power consumption level; and responsive to the amount of power being below the second threshold power consumption level, sending a second signal to the at least one power controller, the second signal causing the at least one power controller to restore the frequency characteristic of the power to its state prior to the sending of the first signal.

17. The method of claim 13, further comprising:

determining at least one low priority computing device included in the plurality of computing devices, the at least one low priority computing device configured to operate with lower availability than other ones of the plurality of computing devices; and sending the signal to cause the at least one power controller to alter at least one characteristic of the power provided to the at least one low priority computing device.

18. The method of claim 13, further comprising:

prior to sending the signal, sending at least one notification indicating that the power to the at least one of the plurality of computing devices is to be altered.

19. The method of claim 13, wherein:

the plurality of computing devices are mounted in one or more racks;

the at least one power distribution component comprises at least one power distribution unit (PDU) mounted in the one or more racks to supply power to the plurality of computing devices in the one or more racks; and the power controller is included as a component of the at least one PDU to alter at least one characteristic of the power supplied by the at least one PDU to the at least one of the plurality of computing devices mounted in the one or more racks.

20. The method of claim 13, wherein:

the plurality of computing devices are mounted in one or more racks; and the power controller is included as a component of the at least one power distribution component that is external to the one or more racks.

\* \* \* \* \*